US012633809B2

(12) United States Patent
Dotz et al.

(10) Patent No.: US 12,633,809 B2
(45) Date of Patent: May 19, 2026

(54) METHOD FOR PRODUCING AN ACTIVE PART FOR A ROTATING ELECTRIC MACHINE

(71) Applicant: Valeo eAutomotive Germany GmbH, Erlangen (DE)

(72) Inventors: Boris Dotz, Erlangen (DE); Christian Finger-Albert, Erlangen (DE); Sebastian Beetz, Erlangen (DE); David Förster, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 734 days.

(21) Appl. No.: 17/955,646

(22) Filed: Sep. 29, 2022

(65) Prior Publication Data

US 2023/0108304 A1    Apr. 6, 2023

(30) Foreign Application Priority Data

Oct. 1, 2021    (EP) ..................................... 21200536

(51) Int. Cl.
| | |
|---|---|
| *H01F 7/06* | (2006.01) |
| *B23K 26/24* | (2014.01) |
| *H02K 3/28* | (2006.01) |
| *H02K 15/35* | (2025.01) |

(52) U.S. Cl.
CPC ............. *H02K 15/35* (2025.01); *B23K 26/24* (2013.01); *H02K 3/28* (2013.01)

(58) Field of Classification Search
CPC . H02K 3/12; H02K 3/28; H02K 15/35; B23K 26/24
See application file for complete search history.

(56) References Cited

U.S. PATENT DOCUMENTS

| | | | |
|---|---|---|---|
| 2018/0036836 A1* | 2/2018 | Nakamura | ......... B23K 26/0736 |
| 2023/0107119 A1* | 4/2023 | Dotz | .................... B23K 26/067 |
| | | | 29/598 |

FOREIGN PATENT DOCUMENTS

WO        2019/159737 A1    8/2019

* cited by examiner

*Primary Examiner* — Paul D Kim
(74) *Attorney, Agent, or Firm* — Osha Bergman Watanabe & Burton LLP

(57) ABSTRACT

Described is a method for producing an active part for a rotating electric machine. The method includes providing a core for the active part and shaped conductors which are inserted into the core. The core has an end side and a further end side situated opposite the end side. The core has slots arranged in a circumferential direction in which the shaped conductors are arranged. The shaped conductors extend from the end side to the further end side, and each shaped conductor has a free end which protrudes at the end side and has an end face. Two end faces are joined together and welded by means of a laser beam, which is guided along a pattern having a trajectory.

14 Claims, 6 Drawing Sheets

METHOD FOR PRODUCING AN ACTIVE PART FOR A ROTATING ELECTRIC MACHINE

The invention relates to a method for producing an active part for a rotating electric machine, comprising the following steps: providing a core for the active part and shaped conductors which are inserted into the core, wherein the core has an end side, a further end side which is situated opposite the end side and a plurality of slots which are arranged in the circumferential direction and in which the shaped conductors are arranged, wherein the shaped conductors extend from the end side to the further end side and each have a free end which protrudes at the end side and has an end face; joining in each case two of the end faces to one another, so that the two end faces form a pair, wherein an edge of the end face of a respective shaped conductor consists of an inner edge portion and an outer edge portion, wherein the inner edge portion of the end face of one shaped conductor of a respective pair runs along the inner edge portion of the end face of the other shaped conductor of the pair and a boundary region runs between the inner edge portions; and welding a respective pair of the end faces by means of a laser beam which is guided along a pattern having a trajectory over an area on the edge of which the outer edge portions lie and which includes the boundary region.

In addition, the invention relates to an active part or a rotating electric machine and to a rotating electric machine.

WO 2019/159737 A1 discloses coil segments which are inserted into a core. End portions of the coil segments are joined to one another and surfaces of the end portions, which surfaces form an area with a boundary, are irradiated and welded by means of laser light. The laser light is guided over a rectangular trajectory.

When welding end portions of shaped conductors which are inserted into a core, it is necessary to form a stable and electrically highly conductive welded connection.

Furthermore, an input of energy into the end faces which is as low as possible should be performed in order to prevent the coating of coated shaped conductors from melting.

The invention is based on the object of specifying an improved way of producing an active part for a rotating electric machine compared to the prior art.

According to the invention, this object is achieved in the case of a method of the kind mentioned at the outset in that an energy of the laser beam on the area is input into the respective pair by the guidance along the pattern asymmetrically with respect to a line of symmetry which runs along the boundary region or perpendicularly to the boundary region.

The method according to the invention for producing an active part for a rotating electric machine comprises a step of providing a core for the active part and shaped conductors. The shaped conductors are inserted into the core. The core has an end side. The core has a further end side. The further end side is situated opposite the end side. The core has a plurality of slots. The slots are arranged in the circumferential direction. The shaped conductors are arranged in the slots. The shaped conductors extend from the end side to the further end side. The shaped conductors each have a free end. The free end protrudes at the end side. The free end has an end face. The method according to the invention further comprises a step of joining in each case two of the end faces, so that the two end faces form a pair. An edge of the end face of a respective shaped conductor consists of an inner edge portion and an outer edge portion. The inner edge portion of the end face of a shaped conductor of a respective pair runs along the inner edge portion of the end face of the other shaped conductor of the pair. A boundary region runs between the inner edge portions. The method according to the invention further comprises a step of welding a respective pair of the end faces by means of a laser beam. The laser beam is guided over an area along a pattern. The pattern has a trajectory. The outer edge portions lie on an edge of the area. The area includes the boundary region.

An energy of the laser beam is input onto the area by the guidance along the pattern asymmetrically with respect to a line of symmetry. The line of symmetry runs along the boundary region or perpendicularly to the boundary region.

Owing to the asymmetrical energy distribution proposed according to the invention, the input of energy into the free ends of the shaped conductors can be adapted to the geometry of said shaped conductors, so that both corner regions of the area and also the edge and the centre of the area can be melted in as optimum a manner as possible. As a result, a precise weld seam, welding area or welding bead which utilizes the material of the end portions in an efficient manner can be formed.

The core is preferably formed from a large number of layered individual laminations and/or individual laminations which are electrically insulated from one another. In this respect, the core can also be referred to as a laminated core. The slots can be designed as passage openings through the core which extend from the end side to the further end side.

The shaped conductors are preferably formed from copper. The shaped conductors can be designed as a multiply bent wire which has, in particular, a U shape or a V shape. The shaped conductors can have a further tree end which is situated opposite the free end, protrudes at the end side and likewise has an end face. The free ends preferably protrude from different slots at the end side. One or more current paths is or are preferably formed by welding different shaped conductors to one another. The current paths are designed to generate a magnetic field for generating an electromotive force of the rotating electric machine during energization.

The shaped conductors can have a rectangular or rounded rectangular cross-sectional area at the or a respective free end. The cross-sectional area can have two longitudinal sides which are situated opposite one another and two narrow sides which are situated opposite one another. The end faces are preferably joined to one another in such a way that respective longitudinal sides of the shaped conductors of the pair face one another. The area can be delimited, at least in portions, by the narrow sides and/or by the longitudinal sides which do not face one another. The boundary region is typically formed by a gap between the inner edge portions or contact with the inner edge portions.

The shaped conductors can have an outer electrically insulating surface layer which surrounds an electrically conductive material of the shaped conductors. Provision can be made for the electrically conductive material to be exposed at the free end or at the free ends, so that the surface layer is not damaged by the laser beam during welding.

In a preferred refinement of the method according to the invention, the pattern further has a second trajectory. The abovementioned trajectory can also be referred to or considered to be a first trajectory in this respect.

The asymmetrical power distribution can be implemented in particular by way of the second trajectory running asymmetrically to the first trajectory with respect to the line of symmetry.

In the case of the method according to the invention, provision can also be made for the pattern to have a third trajectory. In order to adequately melt regions of the area which are situated outside the first and the second trajectory, provision can be made for the third trajectory to surround the first and the second trajectory. As an alternative, the third trajectory can run between the first and the second trajectory without overlapping. In this case, an imaginary connecting line, which connects the first trajectory and the second trajectory, can intersect the third trajectory once or twice.

The third trajectory can have a start point and an end point, and in particular run in a straight line between the start point and the end point. However, it is also possible for the third trajectory to be a closed trajectory.

The first trajectory can run in a closed manner. The first trajectory runs, in particular, in a circular, oval or rectangular manner. As an alternative or in addition, the second trajectory can run in a closed manner. The second trajectory can then run in a circular, oval or rectangular manner.

Closed trajectories can have a start point and an end point. The start point and the end point can be identical. It is also possible for the start point and the end point to be different and for the trajectory to overlap in portions.

It is possible for the first trajectory and the second trajectory to run on different sides of the line of symmetry. Therefore, the input of energy can be distributed between both sides of the line of symmetry. The first trajectory and the second trajectory particularly preferably additionally run on different sides of a line which divides the line of symmetry perpendicularly, in particular centrally. As a result, the first and the second trajectory can effectively cover two diagonally opposite corner regions. In other words, the first and the second trajectory can run in quadrants of the area which are situated diagonally opposite.

According to a particular refinement, provision can be made for the second trajectory to run in a closed manner over both sides of the line of symmetry and the first trajectory to run, in particular diagonally, within the second trajectory and intersect the line of symmetry. The first trajectory can then run either—as described above—in a closed manner or have a start point and an end point and in particular run in a straight line between the start point and the end point.

As an alternative to the use of closed trajectories, provision can be made for the first and the second trajectory to each have a start point and an end point which is different therefrom.

Here, the first and the second trajectory can each describe an arched curve, in particular an arc of a circle, an arc of an ellipse, a parabola or a hyperbola, on the area. As an alternative, the first and the second trajectory can each have or consist of a first to third straight portion, wherein the first straight portion extends from the start point, the third straight portion extends in the direction of the end point and the second straight portion connects the first straight portion to the third straight portion. The second straight portion can form a right angle with both the first straight portion and the third straight portion. It is also possible for the second straight portion to be able to form a respective angle of more than 90°, for example at least 100°, preferably at least 120°, particularly preferably at least 130°, with the first straight portion and the third straight portion.

In one development, provision can be made for the first and the second trajectory to run with mirror-image symmetry with respect to a line which is shifted in parallel in relation to the line of symmetry.

As an alternative or in addition to an asymmetrical course of the trajectories, provision can be made for the energy intensity of the laser beam along the first trajectory to be greater or smaller than along the second trajectory.

According to a further refinement, provision can be made in the case of the method according to the invention for the trajectory to have a start point and an end point, which is different therefrom, and intersect the line of symmetry between the start point and the end point at least twice, preferably at least four times. The course of the trajectory can be, in particular, meandering. In one development, the second trajectory can have a start point and an end point, which is different therefrom, and run, in particular in a straight line, entirely on one side of the line of symmetry. In addition, the pattern can further have a third trajectory which has a start point and an end point, which is different therefrom, and runs, in particular in a straight line, entirely on the side of the line of symmetry on which the second trajectory does not run. The energy intensity of the laser beam along the second and/or the third trajectory can be greater than along the first trajectory.

In the case of the method according to the invention, a laser device which generates the laser beam can be used which can be operated in a deactivated state, in which the laser beam is turned off or has an insufficient power for melting a material of the shaped conductors, and in an activated state, in which the laser beam can melt the material of the shaped conductor. Here, the welding step can comprise the following steps for a respective trajectory: aligning the reader device with the start point of the trajectory in the deactivated state; guiding the laser beam from the start point, along the trajectory, to the end point of the trajectory in the activated state of the laser device; wherein the laser device is moved from the deactivated state to the activated state between the alignment and the guidance when the laser device is aligned with the start point of the trajectory, and is moved from the activated state to the deactivated state when the guidance has reached the end point of trajectory.

The active part may be a stator or a rotor. The rotor is, in particular, externally excited. The rotor can, in particular, also be permanently excited.

The object on which the invention is based is further achieved by an active part for a rotating electric machine, obtained by the method according to the invention and/or comprising: a core and shaped conductors which are inserted into the core, wherein the core has an end side, a further end side which is situated opposite the end side and a plurality of slots which are arranged in the circumferential direction and in which the shaped conductors are arranged, wherein the shaped conductors extend from the end side to the further end side and each have a free end which protrudes at the end side and has an end face, wherein in each case two of the end faces are joined to one another so that the two end faces form a pair, wherein an edge of the end face of a respective shaped conductor consists of an inner edge portion and an outer edge portion, wherein the inner edge portion of the end face of one shaped conductor of a respective pair runs along the inner edge portion of the end face of the other shaped conductor of the pair and a boundary region runs between the inner edge portions, wherein a respective pair of the end faces is welded by means of a laser beam which is guided along a pattern having a trajectory over an area on the edge of which the outer edge portions lie and which includes the boundary region, wherein an energy of the laser beam on the area has been input into the respective pair by the guidance along the pattern asymmetrically with respect to a line of symmetry which runs along the boundary region or perpendicularly to the boundary region.

The object on which the invention is based is further achieved by a rotating machine comprising a first active part according to the invention and a second active part, in particular according to the invention, wherein the electric machine is designed to drive a vehicle. The vehicle may be a hybrid vehicle or a battery-electric vehicle.

All of the embodiments relating to the method according to the invention can be analogously transferred to the active part according to the invention and the rotating electric machine according to the invention, and therefore the above-described advantages can also be achieved by said active part and said rotating electric machine.

Further advantages and details of the present invention can be found in the exemplary embodiments described below and on the basis of the drawings. These are schematic illustrations in which.

Figure 8:
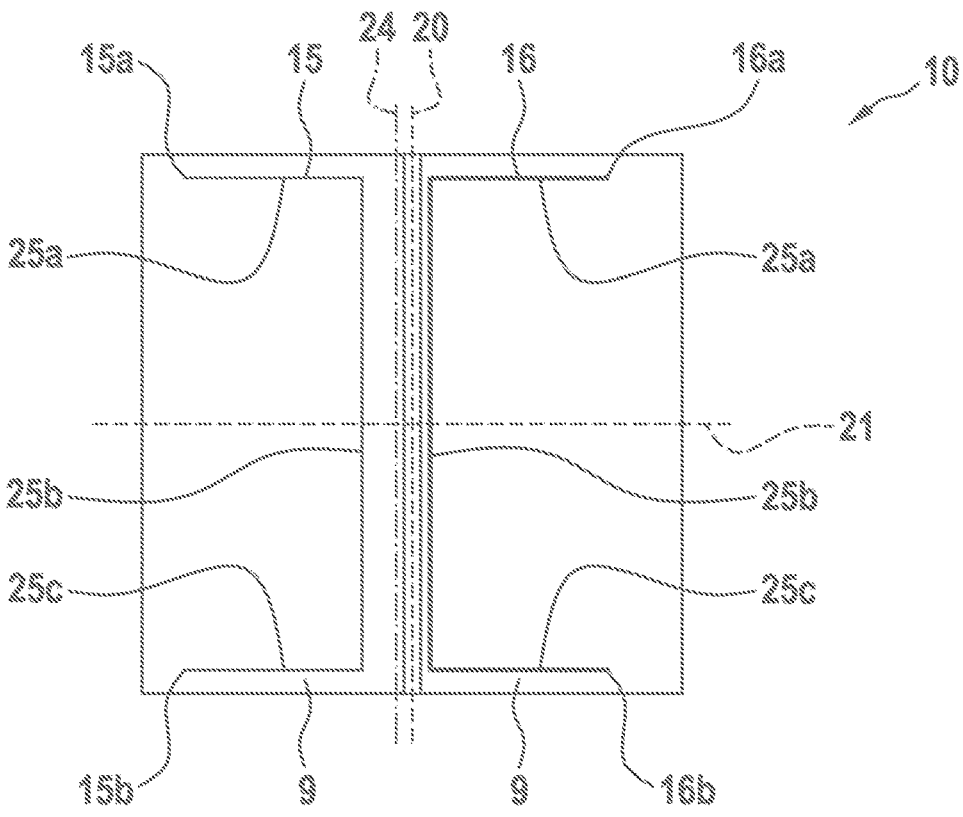
Figure 9:
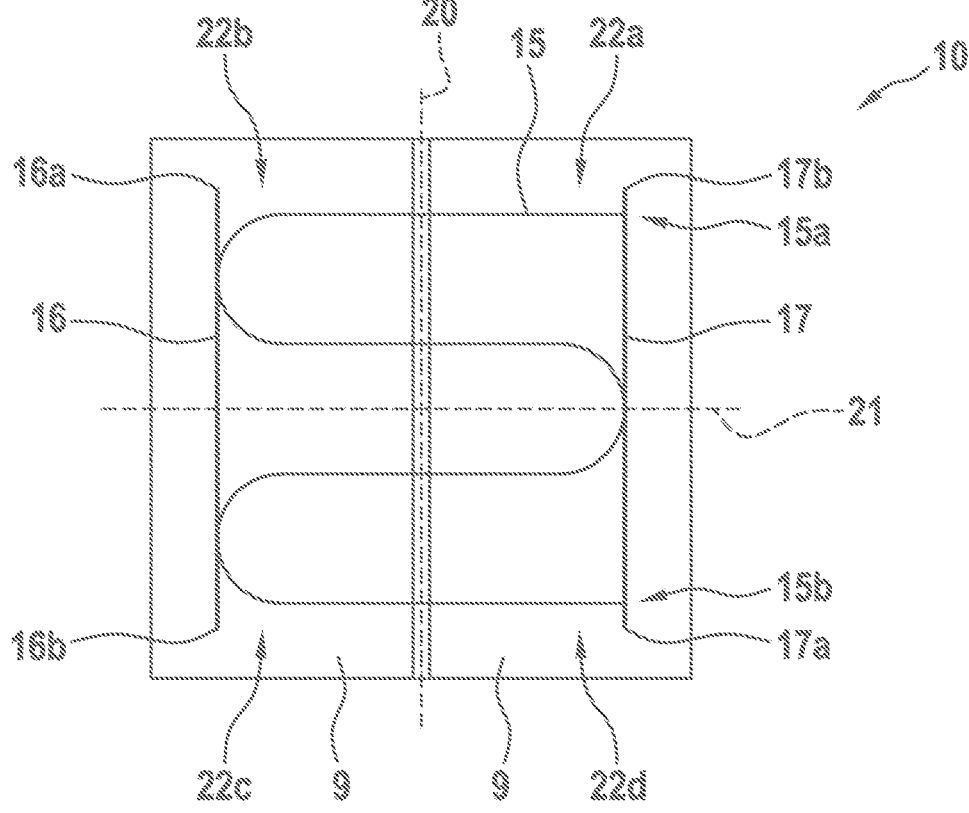
Figure 10:
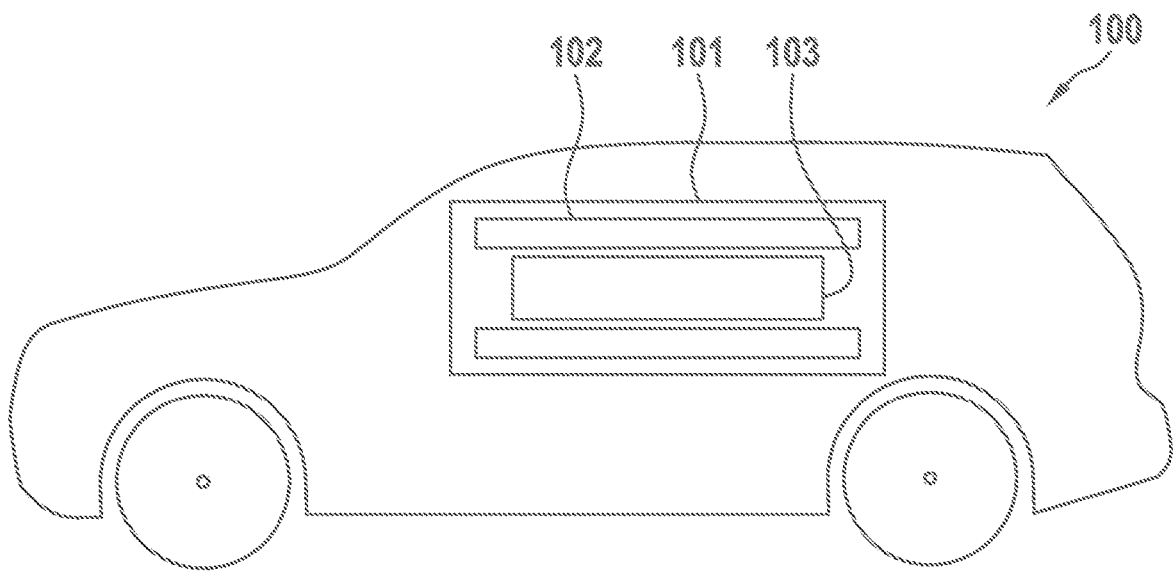

FIGS. 4 to 9 each show an end-side view of the end faces of one of the pairs according to a further exemplary embodiment; and FIG. 10 shows a diagrammatic sketch of a vehicle comprising an exemplary embodiment of the electric machine according to the invention.

Figure 1:
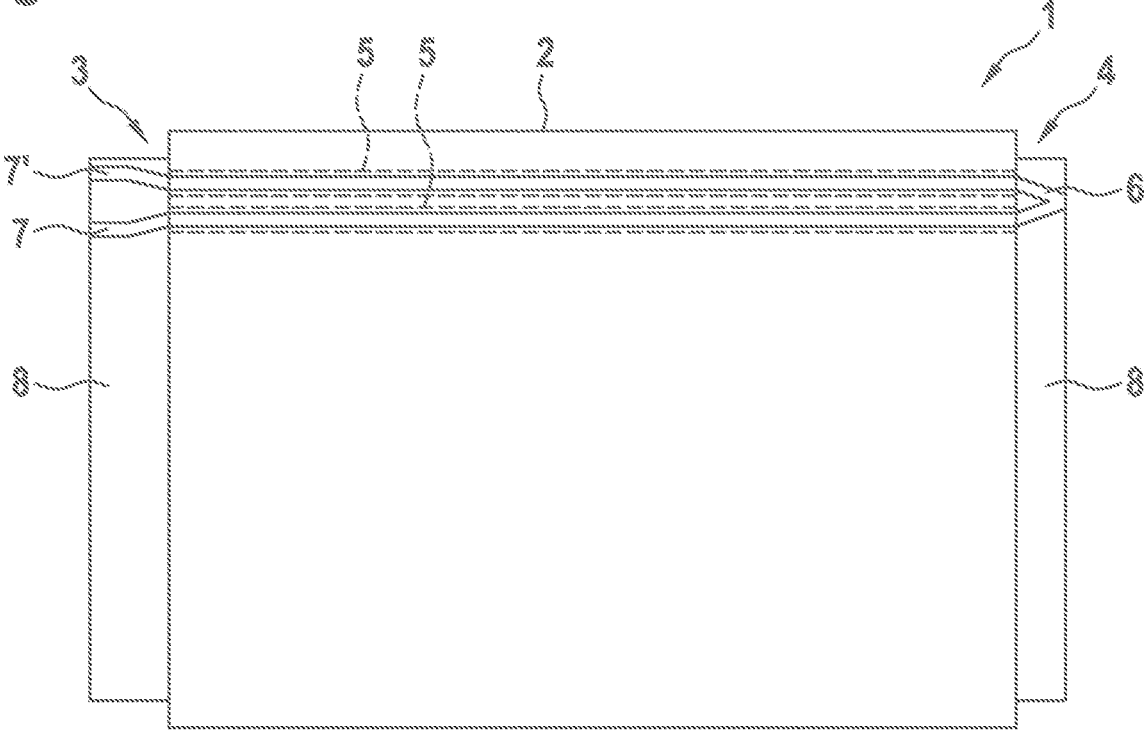
FIG. 1 shows a diagrammatic sketch of a first exemplary embodiment of the active part according to the invention.

FIG. 1 shows a diagrammatic sketch of a first exemplary embodiment of an active part 1 for a rotating electric machine 101 (cf. FIG. 10).

The active part 1 comprises a core 2 which can be formed in a generally known manner from a large number of layered individual laminations (not shown) which are electrically insulated from one another and in this case can also be regarded as a laminated core. The core 2 has an end side 3 and a further end side 4 which is situated opposite the end side 3. Furthermore, a plurality of slots 5 which are arranged in the circumferential direction are formed in the core 2, which slots extend from the end side 3 to the further end side 4 in the axial direction and axially pass through the core 2 entirely. Only two of the slots 5 are illustrated, purely schematically, in FIG. 1.

The active part 1 further comprises a plurality of shaped conductors 6 which are inserted into the core 2, only one single shaped conductor from amongst said plurality of shaped conductors being illustrated in FIG. 1. The shaped conductors 6 extend from the end side 3 to the further end side 4 and each have a free end 7. In the present exemplary embodiment, the shaped conductor 6 is formed, by way of example, from copper and by a multiply bent wire. In this case, the conductor 6 extends from the free end 7 on the end side 3, in the axial direction, to the further end side 4, has a 180° bend at the further end side 4 and extends back from the further end side 4, through another slot 5, to the end side 3. The shaped conductor 6 has a further free end 7' at the end side 3. The shaped conductor 6 accordingly has a U shape or V shape and can also be regarded as a conductor segment of a hairpin winding. The shaped conductors form purely schematically illustrated end windings 8 at both end sides 3, 4.

Figure 2:
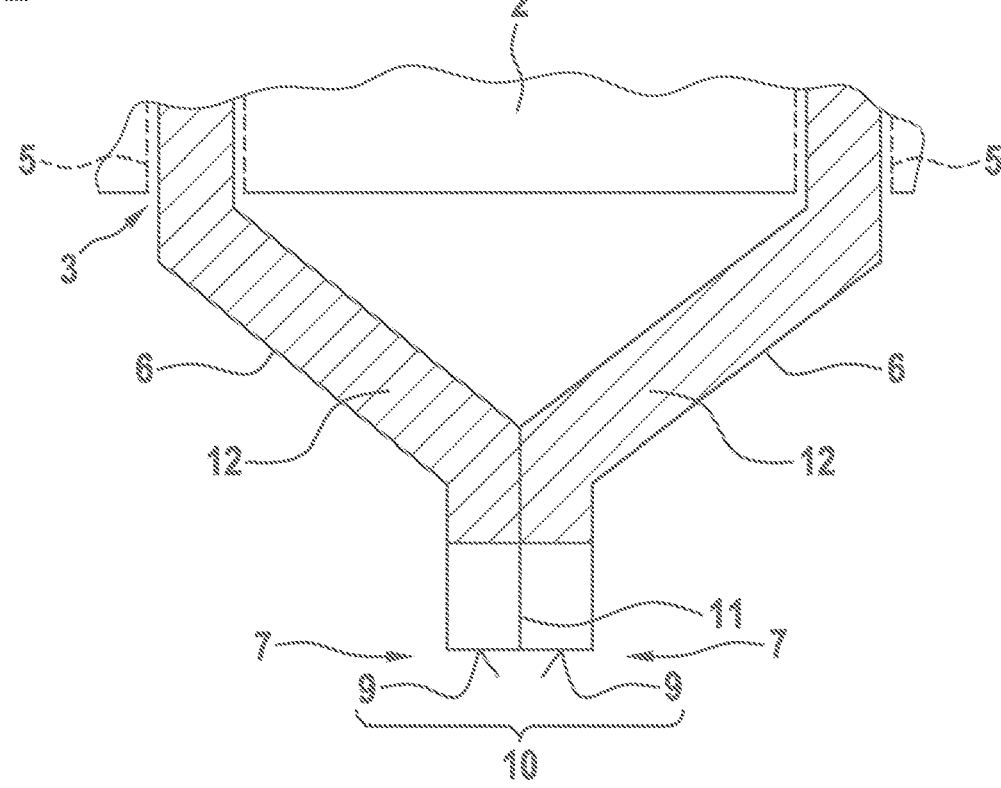
FIG. 2 shows a view of a detail of two shaped conductors in the region of their free ends according to the first exemplary embodiment.

FIG. 2 is a view of a detail of two shaped conductors 6 in the region of their free ends 7 according to the first exemplary embodiment.

Said figure shows that the shaped conductors 6 protrude from the core 2 at its end side 3. The free ends 7 each have an end face 9 which extends substantially perpendicularly to the axial direction or perpendicularly to the direction of extent of the shaped conductors. The end faces 9 are joined together in order to form the pair 10. A gap between the end faces 9 or contact between the end faces 9 forms a boundary region 11 here.

Each pair 10 of the end faces 9 are welded to one another by means of a laser beam, so that the free ends 7 or the shaped conductors 6 are electrically conductively and mechanically connected to one another. One or more current paths is or are formed by the welding, which current paths are designed to generate a magnetic field for generating an electromotive force of the rotating electric machine 101 (see FIG. 10) during energization.

FIG. 2 further schematically shows, using hatching, an outer electrically insulating surface layer 12 of the shaped conductors 6. The surface layer 12 surrounds an electrically conductive material of the shaped conductors 6. The electrically conductive material is exposed only at the free ends 7, 7', so that the surface layer 12 is not damaged by the input of thermal energy of the laser beam.

Figure 3:
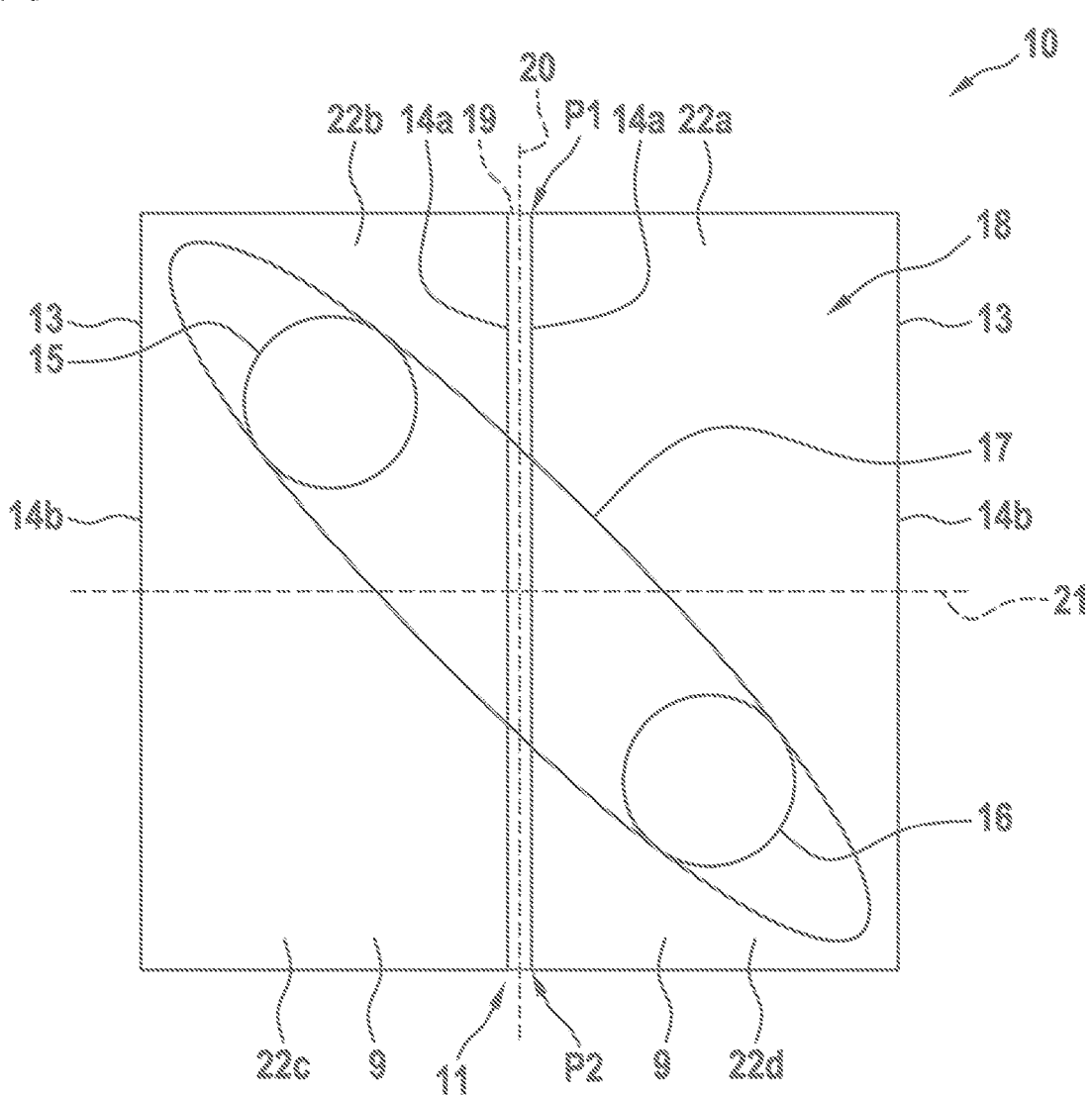
FIG. 3 shows a view of an end side of the end faces of one of the pairs.

FIG. 3 is an end-side view of the end faces 9 of one of the pairs 10 according to the first exemplary embodiment.

As is shown in FIG. 3, an edge 13 of the end face 9 of a respective shaped conductor 6 consists of an inner edge portion 14a and an outer edge portion 14b. The start and the end of the inner edge portion 14a are marked by arrows P1, P2 in FIG. 3. The inner edge portion 14a of the end face 9 of a shaped conductor 6 of a respective pair 10 runs along the inner edge portion 14a of the end face 9 of the other shaped conductor 6 of the pair 10. The boundary region 11 runs between the inner edge portions 14a.

The pair 10 is welded by means of a laser beam which has been guided along a pattern, which has a first trajectory 15, a second trajectory 16 and a third trajectory 17, over an area 18. The outer edge portions 14b of the pair 10 lie on an edge 19 of the area 18. The area 18 also includes the boundary region 11.

An energy of the laser beam on the area 18 has been input into the respective pair 10 by the guidance along the pattern asymmetrically with respect to a line of symmetry 20 which runs along the boundary region.

In the present exemplary embodiment, the trajectories 10 are each closed trajectories, wherein the first trajectory 15 and the second trajectory 16 are circular. The third trajectory 17 is oval or elliptical. On account of the first trajectory 15 and the second trajectory 16 running on different sides of the line of symmetry 20 and also on different sides of a line 21 which divides the line of symmetry 20 centrally, the second trajectory 15 runs asymmetrically to the first trajectory 16 with respect to the line of symmetry 20. Here, asymmetrically with respect to the line of symmetry 20 relates to a lack of mirror-image symmetry.

The line of symmetry 20 and the line 21 divide the area into four quadrants 22a, 22b, 22c, 22d which, when looking at the pair 10 from the end side, are designated in order in the anticlockwise direction. Here, the first trajectory 15 lies entirely in the second quadrant 22b. The second trajectory 16 lies entirely in the fourth quadrant 22d.

In the present exemplary embodiment, the third trajectory 17 surrounds the first and the second trajectory 15, 16 and makes contact with the first and the second trajectory 15, 16 in so doing. The third trajectory 17 extends over all four quadrants 22a-d and extends diagonally beyond the first and the second trajectory 15, 16.

The active part 1 can be designed as a stator 102 or as a rotor 103 (cf. FIG. 10).

Further exemplary embodiments of the active part 1 are described below. Here, identical or equivalent components are provided with identical reference signs.

Figure 4:
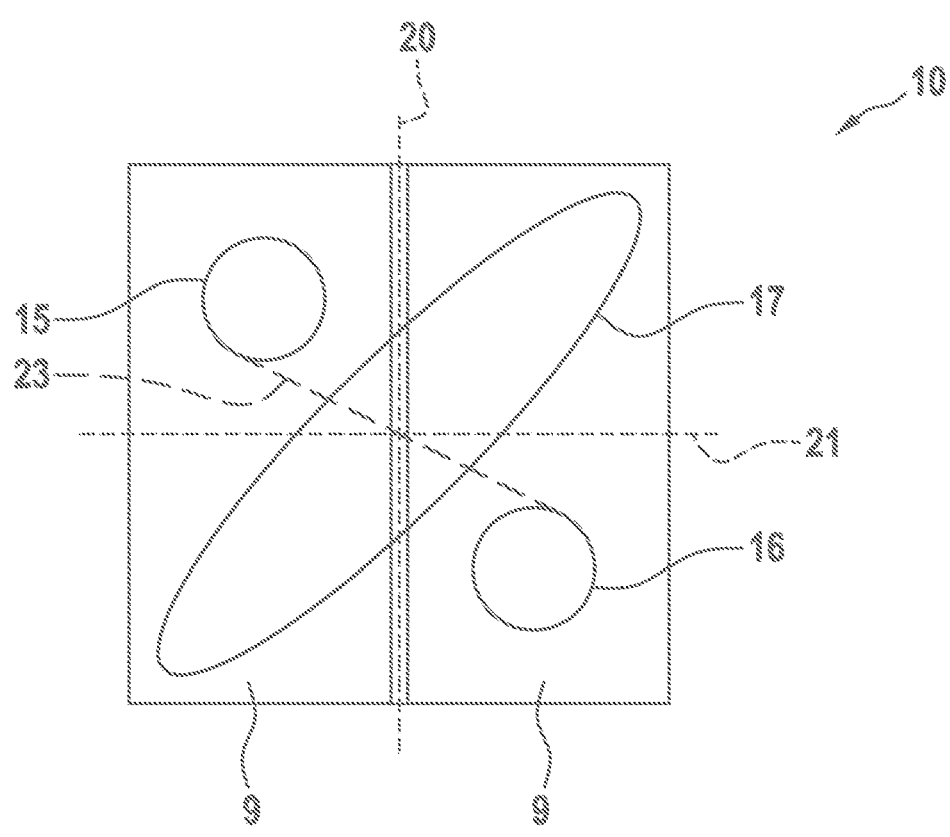

FIG. 4 is an end-side view of the end faces 9 of one of the pairs 10 according to a second exemplary embodiment of the active part 1 to which all of the embodiments relating to the first exemplary embodiment can be transferred, apart from the differences described below. In the second exemplary embodiment, the third trajectory 17 runs between the first trajectory 15 and the second trajectory 16 without overlapping. An imaginary connecting line 23, which connects the first trajectory 15 and the second trajectory 16, intersects the third trajectory 17 twice.

Figure 5:
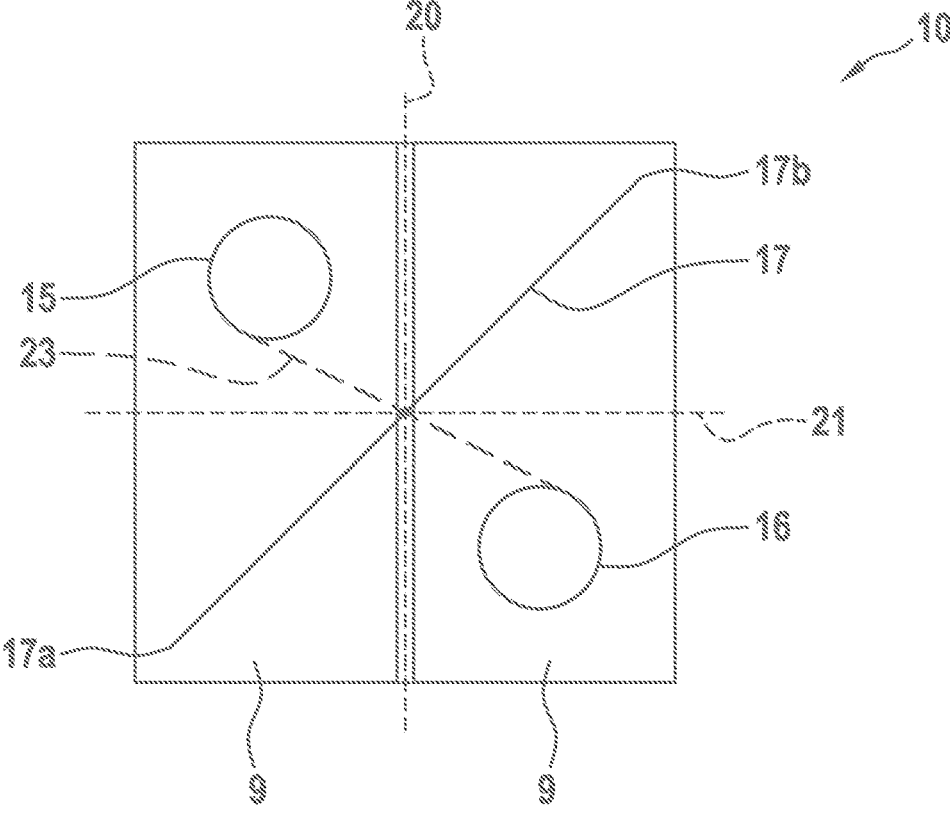

FIG. 5 is an end-side view of the end faces 9 of one of the pairs 10 according to a third exemplary embodiment of the active part 1 to which all the embodiments relating to the second exemplary embodiment can be transferred, apart from the differences described below. In the third exemplary embodiment, the third trajectory 17 has a start point 17*a* and an end point 17*b* which is different therefrom, the third trajectory 17 running in a straight line between said start point and end point. The connecting line 23 intersects the third trajectory 17 only once.

Figure 6:
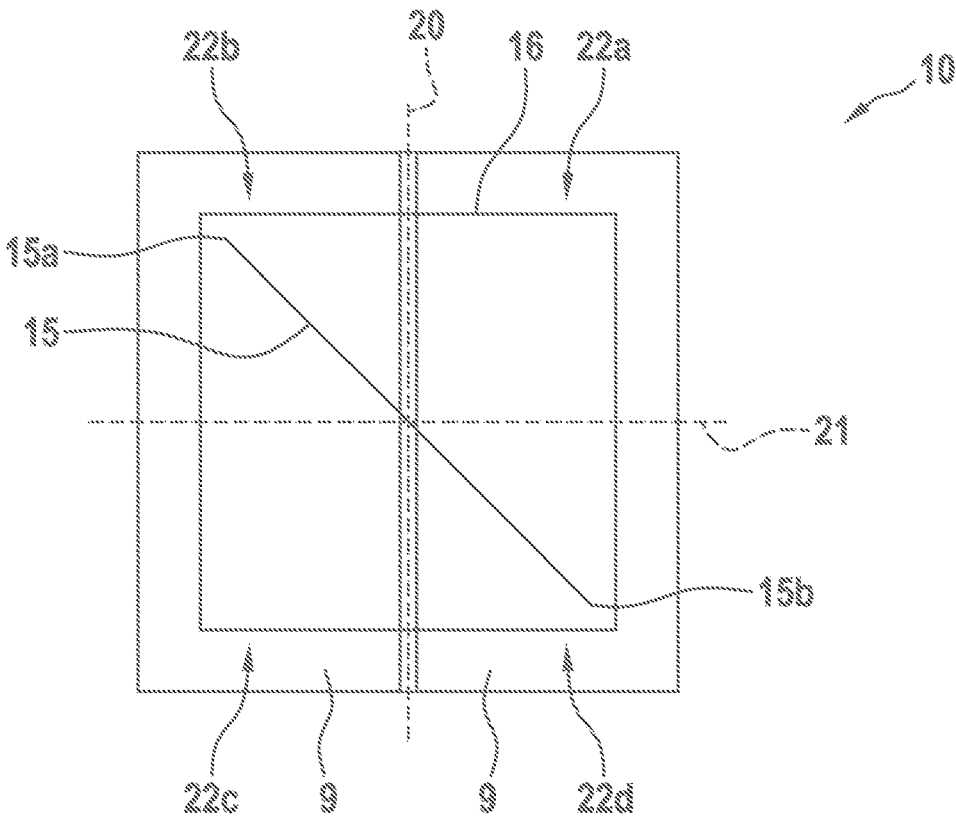

FIG. 6 shows an end-side view of the end faces 9 of one of the pairs 10 according to a fourth exemplary embodiment of the active part 1 to which all the embodiments relating to the first exemplary embodiment can be transferred, apart from the differences described below.

In the fourth exemplary embodiment, the first trajectory 15 has a start point 15*a* and an end point 15*b*, the first trajectory running in a straight line between said start point and said end point and said start point and said end point lying in non-adjacent quadrants 22*b*, 22*d*. The start point 15*a* lies in the second quadrant 22*b*.

The end point lies in the fourth quadrant 22*d*. The first trajectory 15 extends through the point of intersection of the line of symmetry 22 with the line 21.

According to the fourth exemplary embodiment, the second trajectory 16 is a closed trajectory which runs in a rectangular manner. The second trajectory 16 runs both with mirror-image symmetry with respect to the line of symmetry 20 and also with mirror-image symmetry with respect to the line 21. The first trajectory 15 runs diagonally and without overlapping within the second trajectory 16. The second trajectory 16 intersects the line of symmetry 20 and the line 21 twice in each case.

Figure 7:
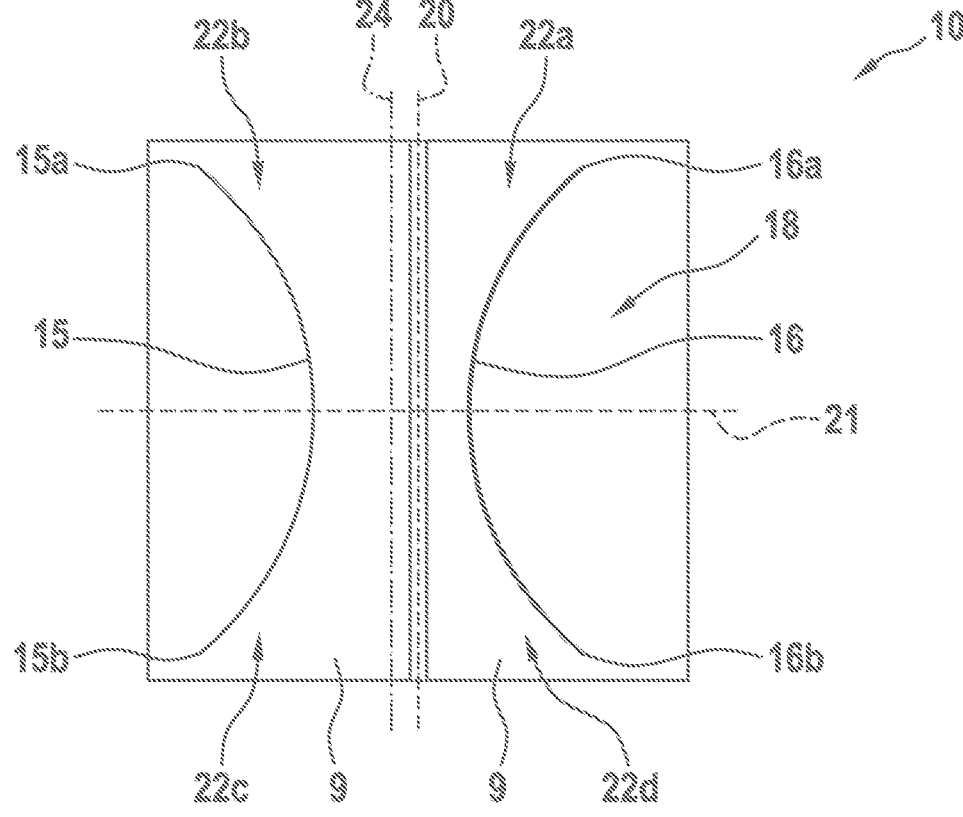

A closed third trajectory is not provided in the fourth exemplary embodiment,

FIG. 7 shows an end-side view of the end faces 9 of one of the pairs 10 according to a fifth exemplary embodiment of the active part 1 to which all the embodiments relating to the first exemplary embodiment can be transferred, apart from the differences described below.

In the fifth exemplary embodiment, both the first trajectory 15 and also the second trajectory 16 each have a start point 15*a*, 16*a* and an end point 15*b*, 16*b*, which is different therefrom, and describe a arched curve, for example an arc of a circle, an arc of an ellipse, a parabola or a hyperbola, on the area 18. The first trajectory 15 and the second trajectory 16 run on different sides of the line of symmetry 20 and each intersect the line 21. The first trajectory 15 lies in the second and the third quadrant 22*b*, 22*c*. The second trajectory 16 lies in the first and the fourth quadrant 22*a*, 22*d*.

The first and the second trajectory 15, 16 run asymmetrically with respect to the line of symmetry 20 in such a way that they run with mirror-image symmetry with respect to a line 24 which is shifted in parallel in relation to the line of symmetry 20. Furthermore, the energy intensity of the laser beam along the first trajectory 15 is lower than along the second trajectory 16. Therefore, in spite of the identical extent of the trajectories 15, 16, the asymmetrical input of energy with respect to the line of symmetry 20 can be performed. The greater energy intensity is represented by a greater line thickness in the case of the trajectory 16.

FIG. 8 is an end-side view of the end faces 9 of one of the pairs 10 according to a sixth exemplary embodiment of the active part 1 to which all the embodiments relating to the fifth exemplary embodiment can be transferred, apart from the differences described below, hi the sixth exemplary embodiment, the first and the second trajectory 15, 16 each consist of a first straight portion 25*a*, a second straight portion 25*b* and a third straight portion 25*c*. The first straight portion 25*a* extends away from the start point 15*a*, 16*a*. The third straight portion 25*c* extends in the direction of the end point 15*b*, 16*b*. The second straight portion 25*b* connects the first straight portion 25*a* to the third straight portion 25*c*. The second straight portion 25*b* forms a right angle with both the first straight portion 25*a* and the third straight portion 25*c*.

FIG. 9 is an end-side view of the end faces 9 of one of the pairs 10 according to a seventh exemplary embodiment of the active part 1 to which all of the embodiments relating to the first exemplary embodiment can be transferred, apart from the differences described below.

In the seventh exemplary embodiment, the first trajectory 15 has a start point 15*a* and an end point 15*b*, which is different therefrom, and intersects the line of symmetry 20 between the start point 15*a* and the end point 15*b* four times. The first trajectory 15 extends in a meandering manner through all four quadrants 22*a-d*.

The second trajectory 16 and the third trajectory 17 each have a start point 16*a*, 17*a* and an end point 16*b*, 17*b*, which is different therefrom, and run between them in a straight line. The second and the third trajectory 16, 17 run in a straight line on different sides of the line of symmetry 20. The energy intensity of the laser beam along the first trajectory 15 is lower than along the second and the third trajectory 16, 17.

According to further exemplary embodiments, the laser beam is guided along the trajectories 15-17 according to the first to fourth exemplary embodiment with different energy intensities.

According to further exemplary embodiments, which correspond to those described above, the line of symmetry 20 intersects the boundary region 11 centrally. The patterns which have the trajectories 15-17 then correspond to the patterns according to FIG. 3 to FIG. 9 rotated through 90°.

Exemplary embodiments of a method for producing the active part 1 according to the preceding exemplary embodiments are described below:

The method comprises a first step of providing the core 2 and the shaped conductors 6 which are inserted into the core 2. In a subsequent second step, two end faces 9 are joined to one another in each case, so that the second end faces 9 form a pair 10.

In a subsequent third step, a respective pair 10 is welded by means of a laser beam which is guided on the end faces 9 of the pair along the trajectories 15-17 according to one of the above-described exemplary embodiments. A laser device which generates the laser beam is used here. The laser device can be operated in a deactivated state, in which the laser beam is switched off or has a power which is insufficient for melting a material of the shaped conductors 6. Furthermore, the laser device can be operated in an activated state, in which the laser beam can melt the material of the shaped conductor 6. The energy intensity of the laser beam is variable in the activated state.

The third step of welding further comprises the following steps for a respective trajectory 15-17: aligning the laser device with the start point 15a-17a of the trajectory 15-17 in the deactivated state; and guiding the laser beam from the start point 15a-17a, along the trajectory 15-17, to the end point of the trajectory 15b-17b in the activated state of the laser device. Here, the laser device is moved from the deactivated state to the activated state between the alignment and the guidance when the laser device is aligned with the start point 15a-17a of the trajectory 15-17, and is moved from the activated state to the deactivated state when the guidance has reached the end point 15b-17b of the trajectory 15-17. Although this has not been illustrated in the exemplary embodiments of the active part 1, the closed trajectories 15-17 of course also have a start point and an end point, which are identical. In the case of the closed trajectory, the start point and the end point can also be different, so that the trajectory overlaps itself.

It should be noted that the active part 1, which is obtained by carrying out the method, does not necessarily have to have weld seams in the form of the trajectories 15-17—depending on the parameterization of the welding process.

FIG. 10 is a diagrammatic sketch of a vehicle 100 comprising an exemplary embodiment of a rotating electric machine 101.

The electric machine 101 has a stator 102 and a rotor 103. The stator 102 and/or the rotor 103 are/is designed as an active part 1 according to one of the above-described exemplary embodiments or are/is obtained by one of the above-described exemplary embodiments of the method.

The electric machine 101 is designed to drive the vehicle 100. The vehicle 100 is accordingly a battery-electric vehicle (BEV) or a hybrid vehicle.

The invention claimed is:

1. A method for producing an active part for a rotating electric machine, comprising:
   providing a core for the active part and shaped conductors which are inserted into the core, wherein the core has an end side, a further end side which is situated opposite the end side and a plurality of slots which are arranged in a circumferential direction and in which the shaped conductors are arranged, wherein the shaped conductors extend from the end side to the further end side and each have a free end which protrudes at the end side and has an end face;
   joining in each case two of the end faces to one another, so that the two end faces form a pair, wherein an edge of the end face of a respective shaped conductor consists of an inner edge portion and an outer edge portion, wherein the inner edge portion of the end face of one shaped conductor of a respective pair runs along the inner edge portion of the end face of the other shaped conductor of the pair and a boundary region runs between the inner edge portions; and
   welding a respective pair of the end faces by a laser beam which is guided along a pattern having a trajectory over an area on the edge of which the outer edge portions lie and which includes the boundary region,
   wherein an energy of the laser beam on the area is input into the respective pair by guidance along the pattern asymmetrically with respect to a line of symmetry which runs along the boundary region or perpendicularly to the boundary region.

2. The method according to claim 1, wherein the pattern further has a second trajectory.

3. The method according to claim 2, wherein the second trajectory runs asymmetrically to the first trajectory with respect to the line of symmetry.

4. The method according to claim 2, wherein the pattern further has a third trajectory which surrounds the first and the second trajectory or runs between the first trajectory and the second trajectory without overlapping.

5. The method according to claim 4, wherein the third trajectory has a start point and an end point and runs in a straight line between the start point and the end point or is a closed trajectory.

6. The method according to claim 2, wherein the first trajectory runs in a circular, oval or rectangular manner, and/or the second trajectory runs in in a circular, oval or rectangular manner.

7. The method according to claim 2, wherein the first trajectory and the second trajectory run on different sides of the line of symmetry and on different sides of a line which divides the line of symmetry perpendicularly and centrally.

8. The method according to claim 6, wherein the second trajectory runs in a closed manner over both sides of the line of symmetry and the first trajectory runs, diagonally, within the second trajectory and intersects the line of symmetry.

9. The method according to claim 2, wherein
   the first trajectory and the second trajectory each have a start point and an end point, which is different therefrom, and describe an arched curve of a circle, an arc of an ellipse, a parabola or a hyperbola, on the area or have or consist of a first to third straight portion, wherein the first straight portion extends from the start point, the third straight portion extends in the direction of the end point and the second straight portion connects the first straight portion to the third straight portion.

10. The method according to claim 9, wherein the first trajectory and the second trajectory run with mirror-image symmetry with respect to a line shifted in parallel in relation to the line of symmetry.

11. The method according to claim 2, wherein an energy intensity of the laser beam along the first trajectory is greater than or lower than along the second trajectory.

12. The method according to claim 2, wherein the trajectory has a start point and an end point, which is different therefrom, and intersects the line of symmetry between the start point and the end point at least four times.

13. The method according to claim 12, wherein the second trajectory has a start point and an end point, which is different therefrom, and runs in a straight line, entirely on one side of the line of symmetry, and the pattern further has a third trajectory which has a start point and an end point, which is different therefrom, and runs, in a straight line, entirely on the side of the line of symmetry on which the second trajectory does not run.

14. The method according to claim 1, wherein the active part is a stator or a rotor of the rotating electric machine.

* * * * *